Patented Oct. 9, 1945

2,386,182

UNITED STATES PATENT OFFICE 2,386,182

ANTIFREEZE COMPOSITION

Frederick R. Balcar, Stamford, Conn., assignor, by mesne assignments, to U. S. Industrial Chemicals, Inc., a corporation of Delaware No Drawing. Application August 8, 1942, Serial No. 454,195

2 Claims. (Cl. 252—76)

This invention relates to compositions generally referred to as "antifreeze," and especially to such compositions designed to inhibit corrosion and rust formation in the cooling systems of internal combustion engines.

For many years it has been customary to mix ethylene glycol with the water used in the engine-cooling systems of motor vehicles for the purpose of depressing the freezing point. The addition of oils such as castor oil to glycol used as antifreeze for the purpose of inhibiting corrosion is well known. Since the oils available for the purpose are insoluble in glycol, a separation occurs in the containers employed in dispensing this material. A uniform product with the proper proportion of the corrosion and rust-inhibiting elements therein should be used in the cooling system to accomplish the intended purpose.

It is the object of the present invention to provide a glycol antifreeze composition in which corrosion and rust-inhibiting elements are thoroughly and uniformly disseminated and mechanically inseparable.

Another object of the invention is the provision of a glycol antifreeze composition which is free from soap and other foam inducing elements so that loss of liquid from the cooling system due to foaming is avoided.

Other objects and advantages of the invention will be apparent as it is better understood by reference to the following specification, in which the preferred embodiments of the invention are described.

Castor oil, which is an excellent anti-corrosive but is insoluble in glycol, can be combined therewith under suitable conditions to afford a mixed monoricinoleate consisting, so far as can be determined, of one part of glyceryl monoricinoleate and two parts of glycol monoricinoleate. This monoricinoleate mixture is soluble in glycol, has corrosion-inhibiting properties practically equivalent to those of castor oil, and includes substantially no soap or other foam-inducing element so that solutions of the product in glycol can be added to the water of engine-cooling systems without danger of loss by foaming. Being soluble in glycol, the product does not separate mechanically, as castor oil does, and the solution remains uniform during shipment and storage. Furthermore the product is compatible with other desirable constituents of a corrosion-inhibiting composition which supplement and improve its quality.

In the practice of the invention, it is necessary to prepare the mixed monoricinoleate by combining castor oil with glycol. The reaction may be effected by the application of heat, but it is possible to hasten the reaction by employing suitable agents, i. e., alkaline catalysts such as alkali metal hydroxides. Preferably, sodium hydroxide is utilized for this purpose, but other agents may be employed.

As an example, the reaction may be conducted in a heated kettle equipped with an agitator of suitable size, for example to handle a 100-gallon charge. It may, of course, be desirable to utilize equipment of any selected capacity. I introduce in the kettle 66⅔ gallons of glycol and heat it to approximately 100° C. Initial heating is desirable as it tends to decrease the development of color. When the glycol is at proper temperature, I add 1.17 gallons of 40% (by weight) aqueous sodium hydroxide solution and mix thoroughly. Solid sodium hydroxide can be added directly to the glycol, but dissolving is tedious and the application of heat to facilitate solution may introduce unnecessary color. Another point to be observed is that there is a certain water tolerance, and consequently the amount of water added must be limited. Water may be employed up to about 2%.

When the sodium hydroxide solution has been thoroughly mixed, I stir in 33⅓ gallons of castor oil and continue stirring while the temperature is raised gradually until the mixture passes suddenly into a one-phase condition. This sudden change corresponds to the reaction which results in the mixture of monoricinoleates of glycerol and glycol. At this point I add 11.13 pounds of boric acid, that is, an amount slightly in excess of that required to neutralize the sodium hydroxide. Sodium hydroxide is employed in the proportion of 1 gram or 1.75 cc. of 40% solution per 100 cc. of glycol, and the amount of boric acid should be approximately double the weight of the sodium hydroxide added.

Following the addition of the boric acid, stirring and heating are continued and the temperature is raised until the liquid shows a cloud point of +13° C. or lower. Usually this point is reached when the temperature is 145° C., but a considerably higher temperature has no serious effect other than a slight increase in the color. The reaction results in a mixture of monoricinoleate of glycerol and glycol and is substantially free from soap which is an undesirable constituent of antifreeze because of its foam-forming proclivity. The product is soluble in glycol.

To prepare an antifreeze, I therefore dissolve in glycol a suitable proportion of the mixed monoricinoleate. The amount used may vary. A relatively small quantity is sufficient, in general from 1 to 3% by volume. Lesser or greater amounts can be used, as for example from 0.5% up to 5%. The higher proportion serves no useful purpose, however, in the application of the invention.

In the preparation of antifreeze for commercial purposes, it is desirable to add other ingredients which supplement the mixed ricinoleate as a corrosion inhibitor. The reaction product of an alkali metal compound such as sodium hydroxide and boric acid is a desirable addition, and I may therefore introduce additional sodium hydroxide, together with sufficient boric acid, to bring the mixture to the desired degree of neutrality. The proportions may vary, though relatively small quantities of these ingredients are desirable in the commercial product. Likewise it is desirable to include a small proportion of sodium nitrite which has marked properties as a corrosion inhibitor.

As an example of a commercial antifreeze, the following composition is satisfactory. The proportions as indicated are subject to considerable variation.

| | | |
|---|---|---|
| Glycol | gallons | 97.35 |
| 40% (by weight) aqueous sodium hydroxide | do | 0.655 |
| Boric acid (preferably powder) | pounds | 5.45 |
| 40% (by weight) aqueous sodium nitrite | gallons | 0.095 |
| Mixed monoricinoleate (as previously described) | do | 1.50 |

A suitable dye to give the solution any desired color may be added in the required proportions.

In preparing the composition, it is preferable to follow the following procedure. First, stir the sodium hydroxide solution into the glycol. Dissolve the boric acid therein with active stirring. Heating to about 70° C. may be resorted to to accelerate the solution. Thereafter stir in the nitrite solution and the monoricinoleate mixture.

The composition as described does not attack rubber and when mixed with water in the usual proportions employed in engine-cooling systems, there is no tendency to foam. Upon dilution with water in the ratio of 1:1 or with higher proportions of water, the monoricinoleate is thrown out of solution as a stable emulsion. It acts as a protective film forming agent to coat the surfaces which are subject to corrosion. Tests conducted in such systems have demonstrated that the antifreeze in suitable proportions will depress the freezing point as required and afford an excellent anti-corrosive and rust preventative. Moreover, the mixed ricinoleate does not separate from the glycol in shipment or storage, and consequently can be dispensed without any special precautions to ensure delivery to the consumer of a uniform product having the desired properties.

Various changes may be made in the composition and the details of procedure as described without departing from the invention or sacrificing the advantages thereof.

I claim:

1. A composition for use as an antifreeze in the cooling systems of internal combustion engines consisting essentially of a solution in ethylene glycol of from 0.5% to 5% of a mixture of monoricinoleates of glycerol and glycol substantially free from soap.

2. A composition for use as an antifreeze in the cooling systems of internal combustion engines consisting essentially of a solution in ethylene glycol of approximately 1 to 3% by volume of a mixture of monoricinoleates of glycerol and glycol substantially free from soap.

FREDERICK R. BALCAR.